US 8,755,455 B2

(12) United States Patent
Heidari et al.

(10) Patent No.: US 8,755,455 B2
(45) Date of Patent: Jun. 17, 2014

(54) QUALITY OF SERVICE AND RATE SELECTION

(75) Inventors: Sam Heidari, Los Altos Hills, CA (US); Rajkumar Samuel, San Jose, CA (US); Sigurd Schelstraete, Menlo Park, CA (US)

(73) Assignee: Quantenna Communications Inc., Fremont, CA (US)

( * ) Notice: Subject to any disclaimer, the term of this patent is extended or adjusted under 35 U.S.C. 154(b) by 0 days.

(21) Appl. No.: 13/513,191

(22) PCT Filed: Jan. 12, 2011

(86) PCT No.: PCT/US2011/000056
§ 371 (c)(1),
(2), (4) Date: May 31, 2012

(87) PCT Pub. No.: WO2011/087905
PCT Pub. Date: Jul. 21, 2011

(65) Prior Publication Data
US 2012/0307934 A1     Dec. 6, 2012

Related U.S. Application Data

(60) Provisional application No. 61/294,441, filed on Jan. 12, 2010.

(51) Int. Cl.
*H04L 27/00*          (2006.01)
(52) U.S. Cl.
USPC ............. 375/295; 327/291; 332/106; 341/20
(58) Field of Classification Search
USPC ........................................................ 375/295
See application file for complete search history.

(56) References Cited

U.S. PATENT DOCUMENTS

| 6,421,381 | B1* | 7/2002 | Raghavan ............... 375/233 |
|---|---|---|---|
| 7,054,296 | B1* | 5/2006 | Sorrells et al. ............ 370/338 |
| 8,488,450 | B2* | 7/2013 | Frazier et al. ............ 370/229 |
| 2004/0030805 | A1* | 2/2004 | Fujimori et al. ............ 709/250 |
| 2006/0268933 | A1 | 11/2006 | Kellerer et al. |
| 2007/0217436 | A1* | 9/2007 | Markley et al. ............ 370/401 |
| 2007/0266134 | A1* | 11/2007 | Shyy et al. ............ 709/223 |
| 2007/0286315 | A1* | 12/2007 | Hong et al. ............ 375/345 |
| 2008/0049709 | A1 | 2/2008 | Pan et al. |
| 2008/0080631 | A1 | 4/2008 | Forenza et al. |
| 2008/0095168 | A1* | 4/2008 | Frazier ............ 370/394 |
| 2008/0095189 | A1* | 4/2008 | Frazier et al. ............ 370/469 |

(Continued)

OTHER PUBLICATIONS

Notification of Transmittal of the International Search Report and the Written Opinion of the International Searching Authority ... Mar. 23, 2011 PCT/US2011/000056 (8 pages).

*Primary Examiner* — Santiago Garcia (57) ABSTRACT

Adjusting a Modulation and Coding Scheme (MCS) or more generally, Layer One parameters, for a data packet based on packet information and priority is disclosed. The packet information can typically be extracted from the packet's header. Considering packet-specific information enables cross-layer optimization that can include consideration of packet error rate (PER) constraints, delay constraints, relative importance of packets within a data stream, beamforming (e.g., off or on, implicit or explicit—longer distances are more likely to merit implicit beamforming) constraints, and aggregation as a function of MCS or channel condition (more aggregation is generally desirable for higher MCS or better channels), to name several examples. It is also possible to differentiate drop probability based on the importance of frames like anchor frames, etc.

1 Claim, 4 Drawing Sheets

(56) References Cited

U.S. PATENT DOCUMENTS

| | | | |
|---|---|---|---|
| 2009/0146852 A1* | 6/2009 | Diab | 341/100 |
| 2009/0168680 A1* | 7/2009 | Singh et al. | 370/312 |
| 2009/0185565 A1* | 7/2009 | Diab et al. | 370/394 |
| 2009/0187778 A1* | 7/2009 | Diab et al. | 713/322 |
| 2009/0189812 A1 | 7/2009 | Xia et al. | |
| 2009/0207057 A1* | 8/2009 | Diab | 341/100 |
| 2009/0261997 A1* | 10/2009 | Diab | 341/100 |
| 2009/0323713 A1* | 12/2009 | Futch et al. | 370/442 |
| 2010/0283673 A1* | 11/2010 | Farrokhi et al. | 342/357.25 |
| 2011/0022923 A1* | 1/2011 | Diab et al. | 714/752 |
| 2011/0039554 A1* | 2/2011 | Bims | 455/434 |
| 2011/0150498 A1* | 6/2011 | Meiman et al. | 398/152 |
| 2011/0283020 A1* | 11/2011 | Frazier et al. | 709/246 |
| 2012/0121265 A1* | 5/2012 | Suvakovic et al. | 398/66 |

* cited by examiner

QUALITY OF SERVICE AND RATE SELECTION

CROSS-REFERENCE TO RELATED APPLICATIONS

This application claims priority to U.S. Provisional Patent Application No. 61/294,441, filed on Jan. 12, 2010, and which is incorporated by reference.

BACKGROUND

A typical wireless network usually comprises at least one access point (AP) through which stations can connect to a wireless network. A common wireless network is a Wi-Fi network, which is a non-technical description that is generally correlated with the IEEE 802.11 standards, as well as Wi-Fi Protected Access (WPA) and WPA2 security standards, and the Extensible Authentication Protocol (EAP) standard. (Wi-Fi certification currently requires conformance with these standards.) A wireless network can include a wireless local area network (WLAN) or a network of some other size.

In a typical implementation, stations are connected to a device with a dedicated application such as data, video, or voice. A Quality of Service (QoS) module identifies and characterizes the packets based upon their importance and application constraints. A rate selection module determines the correct modulation and coding scheme (MCS) for each packet based on channel quality. The MCS as defined per WiFi standards determines constellation size and coding rates. Number of retries may be used when errors are encountered in packet retransmissions.

SUMMARY

The following is described and illustrated in conjunction with systems, tools, and methods that are meant to be exemplary and illustrative, not limiting in scope. Techniques are described to address one or more of deficiencies in the state of the art.

Traffic to nodes can have different needs. For example, compressed video may have different types of frames (e.g., I-frames, P-frames, and B-frames), which may have different levels of importance (e.g., an I-frame can be considered "more important" than a B-frame).

To address the issue of packet-specific (and channel-specific) variations, an intelligent cross-layer optimization engine dynamically adjusts a Modulation and Coding Scheme (MCS), collision avoidance mechanism (e.g., Request To Send and Clear To Send (RTS/CTS)), transmission start times, and/or repetition for a data packet based on packet information and priority. This could be used with multi-user MIMO, in which case each of the parameters could be collectively adjusted for each user in the multi-user MIMO group (transmission start times would be the same, but could choose different time even though it is the same for everyone). For example, video packets that are delay sensitive could be sent at a lower MCS such that retransmissions are avoided. Considering packet-specific information enables cross-layer optimization that can include consideration of packet error rate (PER) constraints, delay constraints, relative importance of packets within a data stream, beamforming (e.g., off or on, implicit or explicit—longer distances are more likely to merit implicit beamforming) constraints, and aggregation as a function of MCS or channel condition (more aggregation is generally desirable for higher MCS or better channels), to name several examples.

The intelligent cross-layer optimization engine can be configured to maximize throughput vs. tunable (e.g., user selected) PER constraints, as opposed to traditional systems where an objective is to achieve zero PER (i.e., maximize throughput). This is desirable, for example, for certain applications doing their own Frame Error Correction (FEC) as the degradation in application performance might be zero until a certain PER level. This type of service may also be negotiated between application and wireless driver and marked in the packet header.

It is also possible to differentiate drop probability based on the importance of frames like anchor frames, etc. Also, Random Early Drop (RED) could be employed to provide relatively graceful degradation of video quality compared to abrupt frame drops when the wireless system detects it is going to go into congestion for a traffic flow.

BRIEF DESCRIPTION OF THE DRAWINGS

Examples of the claimed subject matter are illustrated in the figures.

DETAILED DESCRIPTION

In the following description, several specific details are presented to provide a thorough understanding of examples of the claimed subject matter. One skilled in the relevant art will recognize, however, that one or more of the specific details can be eliminated or combined with other components, etc. In other instances, well-known implementations or operations are not shown or described in detail to avoid obscuring aspects of the claimed subject matter.

Figure 1:
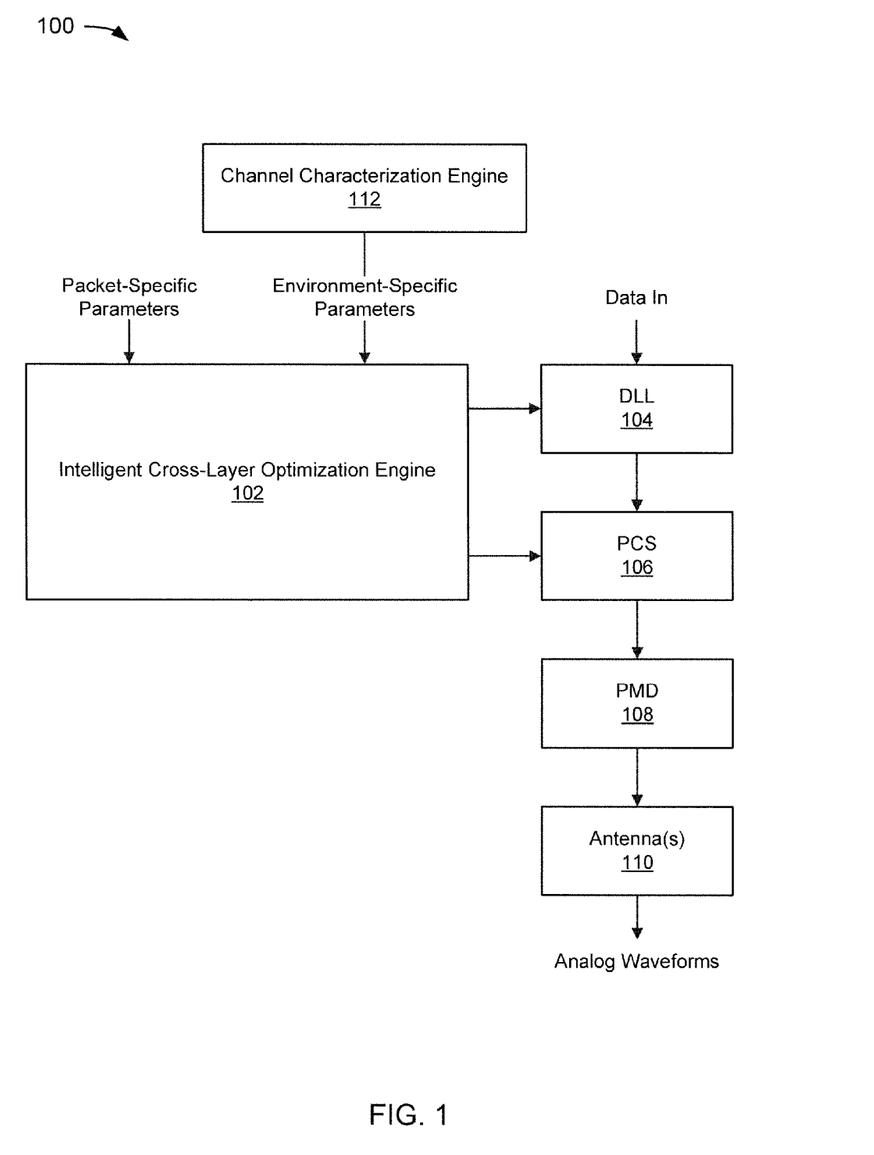
FIG. 1 depicts an example of a system with an intelligent cross-layer optimization engine.

FIG. 1 depicts an example of a system 100 with an intelligent cross-layer optimization engine. The system 100 includes an intelligent cross-layer optimization engine 102, a Data Link Layer (DLL) 104, a Physical Coding Sublayer (PCS) 106, a Physical Medium-Dependent Sublayer (PMD) 108, and antenna(s) 110. The PCS 106 and the PMD 108 can be considered part of the Physical Layer (PHY). The components can be implemented on a station, such as an Access Point (AP) to a wireless local area network (WLAN).

A station, as used in this paper, may be referred to as a device with a media access control (MAC) address and a PHY interface to a wireless medium that complies with the Institute of Electrical and Electronics Engineers (IEEE) 802.11 standards, which would include Wi-Fi-compliant devices since Wi-Fi is generally considered a superset of the 802.11 standards. In alternative embodiments, a station may comply with a different standard than IEEE 802.11, or no standard at all, may be referred to as something other than a "station," and may have different interfaces to a wireless or other medium. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents.

A station that has multiple antennas may be capable of multiple-input and multiple-output (MIMO) communication. It may be noted that multiple-input and single-output (MISO), single-input and multiple-output (SIMO), and single-input and single-output (SISO) are special cases of MIMO. MISO is when the receiver has a single antenna. SIMO is when the transmitter has a single antenna. SISO is when neither the transmitter nor the receiver have multiple antennae. As used in this paper, techniques may be applicable to any of these special cases, depending upon whether the techniques can be used with one transmitter (Tx) antenna and/or one receiver (Rx) antenna. Thus, the acronym MIMO could be considered to include the special cases, if applicable. The techniques may also be applicable to multi-user MIMO (MU-MIMO), cooperative MIMO (CO-MIMO), MIMO routing, OFDM-MIMO, or other MIMO technologies.

Coding, as used in this paper, is adding systematically generated redundant data (also known as an error-correcting code) to a modulated signal. Coding enables a decoder at a receiver to detect and perhaps correct bit errors. The Packet Error Rate (PER) is the probability that one or more bits in a block of coded bits is decoded in error. (In this paper, although PER is different from bit error rate (BER), the term PER is treated as a more general term that could be read as BER depending upon the context.) The amount of error reduction provided by a given code is typically characterized by its coding gain in Additive White Gaussian Noise (AWGN) and its diversity gain in fading. As used in this paper, coding gain in AWGN is defined as the amount the Signal-to-Noise power Ratio (SNR) can be reduced under the coding technique for a given PER. A Modulation and Coding Scheme (MCS) uses a joint design of code and modulation to obtain coding gain without bandwidth expansion. Good performance in fading can be optimized by combining AWGN channel codes with interleaving and by designing the code to optimize its inherent diversity.

The term "layer" is used in this paper in accordance with standard industry use. The Open Systems Interconnection (OSI) model is a way of sub-dividing a communications system into smaller parts called layers. A layer is a collection of conceptually similar functions that provide services to the layer above it and receives services from the layer below it. On each layer, an instance provides services to the instances at the layer above and requests service from the layer below. Although other models (e.g., TCP/IP model) define different layers, it is not difficult for those with skill in computer science to compare other models with the OSI model.

Layer One of the OSI Model, the Physical Layer, defines the electrical and physical specifications for devices. In particular, it defines the relationship between a device and a transmission medium, such as a copper or optical cable. This includes the layout of pins, voltages, cable specifications, hubs, repeaters, network adapters, host bus adapters (HBA) used in storage area networks, and more. Various Physical Layer Ethernet standards are in the Physical Layer; Ethernet incorporates both this layer and the DLL. The same applies to other local-area networks, such as token ring, FDDI, ITU-T G.hn, and IEEE 802.11, as well as personal area networks such as Bluetooth and IEEE 802.15.4. It is not uncommon to refer to the Physical Layer as PHY, particularly in the context of 802.11a/b/g/n PHY or ITU-T G.hn PHY. However, in this paper "PHY" is intended to include any applicable Physical Layer (including proprietary or ad hoc) or applicable portion thereof, and the term PHY is used henceforth.

The major functions and services performed by the PHY are: Establishment and termination of a connection to a communications medium; participation in the process whereby the communication resources are effectively shared among multiple users; modulation, or conversion between the representation of digital data in user equipment and the corresponding signals transmitted over a communications channel (these are signals operating over the physical cabling or over a radio link).

Layer Two of the OSI model, the DLL provides the functional and procedural means to transfer data between network entities and to detect and possibly correct errors that may occur in the PHY; the DLL manages the interaction of devices with a shared medium. (The DLL is part of or corresponds to the Link Layer of the TCP/IP reference model.) Both WAN and LAN services arrange bits from the PHY into logical sequences called frames. Not all PHY bits necessarily go into frames, as some of these bits are purely intended for PHY functions.

IEEE 802.3 (Ethernet) is the dominant wired LAN protocol and IEEE 802.11 the dominant wireless LAN protocol. The IEEE 802.11 protocol defines MAC and Logical Link Control (LLC) sublayers of the DLL. The MAC sublayer detects but does not correct errors. Above the MAC sublayer is the media-independent IEEE 802.2 LLC sublayer, which deals with addressing and multiplexing on multiaccess media.

In the example of FIG. 1, the intelligent cross-layer optimization engine 102 is referred to as a "cross-layer optimization" engine because it enables the system 100 to optimize a stream based upon considerations from multiple operational layers. In contrast, QoS mechanisms queue packets based upon the grade of QoS, but do not modify the PHY parameters as a function of the packet type. So the optimization of QoS results in guaranteed service for certain grades of packet traffic based on packet characteristics (specifically, the QoS grade of the packet), but optimization based upon channel characteristics has nothing to do with the QoS of the packet since all queued packets, once they are queued, use the same MCS. Advantageously, the intelligent cross-layer optimization engine 102 can adjust MCS, transmission start times, medium reservation, transmission redundancy, aggregation, and fragmentation using packet-specific parameters (e.g., associated with PER constraints) and environment-specific parameters (e.g., associated with channel conditions).

The intelligent cross-layer optimization engine 102 receives packet-specific parameters and environment-specific parameters. The environment-specific parameters are generally related to channel conditions on a particular channel, and can generally be used to characterize a channel as "good" or "bad." The packet-specific parameters can include by way of example length, PER constraints, delay constraints, constraints associated with the type of frame, robustness constraints, beamforming constraints (which can include whether beamforming should be used and/or an implicit/ explicit beamforming requirement), aggregation constraints, and fragmentation constraints, to name several. Whether a particular parameter is used is implementation-specific. For example, if the antenna(s) 108 includes only one antenna or is otherwise not used for beamforming (or if beamforming is not appropriately configurable), there would be no need to receive a beamforming requirement parameter. The intelligent cross-layer optimization engine 102 can use a search function, a lookup table, or some other applicable organizational data structure to match packet-specific parameters under channel conditions associated with the environment-specific parameters with applicable MCS, transmission start time, medium reservation scheme, transmission redundancy, aggregation, or fragmentation. The packet-specific parameters can be set for users or services.

For implementations that include beamforming parameters and beamforming capabilities, the parameters can also determine which packets or data streams get to use beamforming, potentially including whether the beamforming is implicit or explicit. In an embodiment in which not all bits transmitted over a channel have the same priority or PER constraint, Unequal Error Protection (UEP) codes can be used. For example, a source encoder divides a data sequence into M parallel bit streams of decreasing priority. A channel encoder includes codes $C_1, \ldots, C_M$ with decreasing codeword distances. If $2^M$ points in a signal constellation are numbered 0 to $2^M-1$, the point selector chooses the constellation point s corresponding to $$s = \sum_{i=1}^{M} s_i 2^{i-1}.$$

Trellis coded modulations with different coding gains can also be used for each priority class.

Beamforming can optimize performance for users or services in a number of ways, but requires the use of multiple antennas. Advantageously, a beamforming parameter can be defined as a function of MCS or channel condition to ensure that beamforming is used when it is most valuable. For example, when MCS is low, the beamforming overhead may not be worth the gain. Another aspect of the beamforming parameter is whether beamforming should be implicit or explicit for a user or service. For example, for longer distances or lower-ranked channels, it is more likely that implicit beamforming would be selected, as compared to higher-ranked channels.

For multi-user MIMO, an AP (or, more generally, a station) can transmit data to a first station and a second station (or more than two). If the AP knows the amount of data that is to be sent to the first station and the second station, the AP can attempt to send the data and minimize idle time. So, for example, if less data is going to be sent to the first station than to the second station, the data to the first station can be sent with greater redundancy. In general, for multi-user MIMO, the matching of MCS, transmission redundancy, aggregation, and/or fragmentation can be determined on a per-user basis. (Transmission start time will normally be the same for all users in multi-user MIMO, but could be dynamically adjusted for the group based on environment-specific conditions.) Medium reservation schemes (e.g., utilizing the RTS/CTS protocol) can be done for all users uniformly, for each user, only for certain users, or not at all. So, medium reservations schemes may or may not be treated as per-user, depending upon the implementation.

An aggregation or fragmentation rules can be set for a user or service to establish when to aggregate packets into larger packets or fragment packets into smaller packets. Advantageously, the rules can be set as a function of packet-specific constraints and environment-specific conditions to ensure optimal aggregation or fragmentation is used. For example, a packet may have certain delay, length, frame type, robustness, or other constraints or characteristics. While it is known that when channel conditions are good, more aggregation will generally result in improved gain, and when channel conditions are poor, more fragmentation will generally result in improved gain, the principle is normally applied to improve throughput. When applied in a per-service or per-user context, the service or user can effectively force subjectively optimal conditions on the data of the service or user.

Aggregation and fragmentation rules can be applied at the DLL 104. The reason aggregation and fragmentation rules are applied at the DLL 104 is that it is a packet-level (rather than bit-level) optimization technique. That is, aggregation and fragmentation rules apply to Layer 2 packets.

At the PCS 106, the intelligent cross-layer optimization engine 102 can optimize in accordance with Layer 1 bits. For example, per-user or per-service PER constraints can enable throughput-versus-PER adjustments for data of a user or service. This can be desirable for certain applications doing their own FEC as the degradation in application performance might be zero until a certain PER level. For example, while reducing PER can generally reduce power requirements, perhaps at a cost of decreased data rate or increased signal bandwidth, on good channels, FEC provides little or no advantage because the PER is sufficiently low. The intelligent cross-layer optimization engine 102 can control the PCS 106 (e.g., an FEC encoder in the PCS 106) to encode data bits in accordance with the PER requirements parameter. For example, Hamming distance of the code can be adjusted at the FEC encoder based on the PER parameter. As another example, an interleaver in the PCS 106 can spread out bursts of errors over time to provide a form of time diversity that can be adjusted based on the PER parameter. This type of service may also be negotiated between application and wireless driver and marked in a packet header.

A delay constraint can be set for a service or user. QoS techniques already address the needs of certain classes of traffic by queuing traffic having a high QoS grade in high priority queues. However, the queuing does not change treatment of the data stream on the PHY. By considering delay constraints, which may or may not simply be a form of priority rather like (but not necessarily the same as) a QoS grade, the intelligent cross-layer optimization engine 102 can influence the behavior of the data stream at the PCS 106. Specifically, different MCS, transmission start times, media reservation schemes, and transmission redundancy can be set depending upon the delay constraints associated with data of a user or service. As was previously mentioned, the selected data characteristics will normally be a function of both packet-specific parameters (such as a delay constraint) and environment-specific parameters, since certain MCS choices may be suboptimal for certain channel conditions (and transmission start time cannot be meaningfully adjusted unless at least something about the environment is known).

A robustness constraint can be set for a service or user, and operates similarly to the delay constraint described in the preceding paragraph, though it could result in different MCS and other choices for a given robustness parameter.

Some rules can be based on type of frame within data of a service or user. For example, compressed video frames can be divided into multiple different types of frames that can include I-frames, P-frames, and B-frames. I-frames represent a fixed image that is independent of other picture types, and each Group Of Pictures (GOP) starts with an I-frame. P-frames contain motion-compensated difference information from the preceding I- or P-frame. So it may be desirable to ensure that the I-frame is treated as a higher priority frame within a GOP. While it is possible to distinguish between the different types of frames, and perhaps even address the relative importance of the I-frames relative to, e.g., the P-frames, with queuing, the intelligent cross-layer optimization engine 102 enables different treatment of data from an I-frame at the PCS 106 (i.e., at a sublayer of the PHY layer). As a specific example, I-frames of a compressed video data stream could be given lower MCS than P-frames. This can increase performance of video streams that can tolerate the loss of P-frames more readily than I-frames. Thus, the PCS 106 can adjust characteristics of a data stream using knowledge about, e.g., a user or service, and one of a plurality of frames of the user or service that would not normally be considered when encoding the bits of the data stream.

A packet importance parameter can be set for a service to enable a differentiation in drop probability based on importance of frames like anchor frames. This could include implementation of a Random Early Drop (RED) mechanism to provide somewhat graceful degradation of, e.g., video quality, rather than abrupt frame drops when the wireless system detects imminent or current congestion.

In the example of FIG. 1, the DLL 104 receives data (indicated as "Data In" in the example of FIG. 1). As described above, the DLL 104 can use parameters from the intelligent cross-layer optimization engine 102 to aggregate or fragment data packets, which will respectively result in relatively longer or relatively shorter bit streams per PHY packet. Advantageously, the consideration can take into account both channel conditions and characteristics of the packets (e.g., interference on the channel, length or priority of the packet, etc.). The channel conditions and characteristics of the packets can be passed on to the PCS 106, which can apply cooperative optimization based upon the same conditions and characteristics that were considered at the DLL 104.

The PCS 106 can perform autonegotiation and coding, such as 8b/10b encoding. Typically, the objective of coding at the PHY is achieving zero PER. This enables a system to maximize throughput. However, it may not be "optimal" to simply maximize throughput, as has been described above. The PCS 106 can be implemented as a Forward Error Correction (FEC) encoder, bit interleaver, constellation mapper, and precoding engine, or with some other combination of known or convenient components. (One or more of these components could also or instead be considered part of the PMD 108.) With whatever components are used, the PCS 106 processes digital data such that an analog waveform having certain characteristics can eventually be produced. Advantageously, these "certain characteristics" can be adjusted as indicated by the intelligent cross-layer optimization engine 102, taking into account packet- and environment-specific considerations.

In the example of FIG. 1, the PCS 106 is operationally connected to the PMD 108. The PMD 108 can include a digital-to-analog converter (DAC) and RF chains. Digital data from the PCS 106 is converted to analog waveforms at the DAC and upconverted to a desired carrier frequency by the RF chains. The analog waveforms are provided through the RF chains to the antenna(s) 110 for transmission. The number of RF chains will typically correspond to the number of antenna(s) 110. The RF chains can be part of a circuit that includes a controller capable of tuning to a desired carrier frequency.

In the example of FIG. 1, the PMD 108 is operationally connected to the antenna(s) 110. Generally as used in this paper, an "antenna array" includes multiple antennas coupled to a common source or load to produce a directive radiation pattern. With an antenna array, the spatial relationship between the antennas can contribute to directivity. If there is only one antenna, certain functionality, such as MIMO, is not normally possible. It should be noted that reference to a Tx antenna in this paper does not necessarily mean that the antenna is dedicated to transmission only; the same antenna can, depending upon the implementation, be used for both Tx and Rx. So a designation of an antenna as Tx or Rx could be considered a description of use at a point in time, unless context dictates otherwise.

Assuming the antenna(s) 110 include multiple antennas, the system 100 may be capable of precoding, spatial multiplexing, and/or diversity coding. Spatial multiplexing can be combined with precoding, e.g., when the channel is known at the transmitter or combined with diversity coding, e.g., when decoding reliability is in trade-off.

Precoding, as used in this paper, is used in conjunction with multi-stream transmission in MIMO radio systems. In precoding, the multiple streams of the signals are mapped onto the transmit antennas with independent and appropriate weighting per each antenna such that some performance metric such as the link throughput is maximized at the receiver output. Some benefits of precoding include increasing signal gain on one or more streams through diversity combining, reducing delay spread on one or more streams.

Beamforming, as used in this paper, is a special case of precoding in which a signal is emitted from each of the transmit antennas with appropriate weighting such that some performance metric such as the signal power is maximized at the receiver. Some benefits of beamforming include increasing signal gain for specific streams by mapping the streams to specific modes of the channel.

A MIMO antenna configuration can be used for spatial multiplexing. In spatial multiplexing, a high rate signal is split into multiple lower rate streams, which are mapped onto the Tx antenna array. If these signals arrive at an Rx antenna array with sufficiently different spatial signatures, the receiver can separate the streams, creating parallel channels. Spatial multiplexing can be used to increase channel capacity. The maximum number of spatial streams is limited by the lesser of the number of antennas at the transmitter and the number of antennas at the receiver. Spatial multiplexing can be used with or without transmit channel knowledge.

A data stream transmitted via the antenna array 110 can be received by a receiver (not shown) and converted to digital in a known or convenient manner, such that the Data In is reproduced at the receiver as Data Out. The receiver can help, generally by providing processed or unprocessed feedback, the channel characterization engine 112 generate the environment-specific parameters that the intelligent cross-layer optimization engine 102 uses. The channel characterization engine 112 can, depending upon the implementation, estimate channel conditions without feedback from a receiver, as well.

The example of FIG. 1 illustrates a transmitter, as was described above, a receiver, which would perform steps similar to those described above for a transmitter in reverse order, or a transceiver that is capable of both transmitting and receiving. Stations are typically capable of both transmitting and receiving. Examples of transmitter and receiver components that could be implemented in the system 100 are illustrated below with respective reference to FIGS. 2 and 3.

Figure 2:
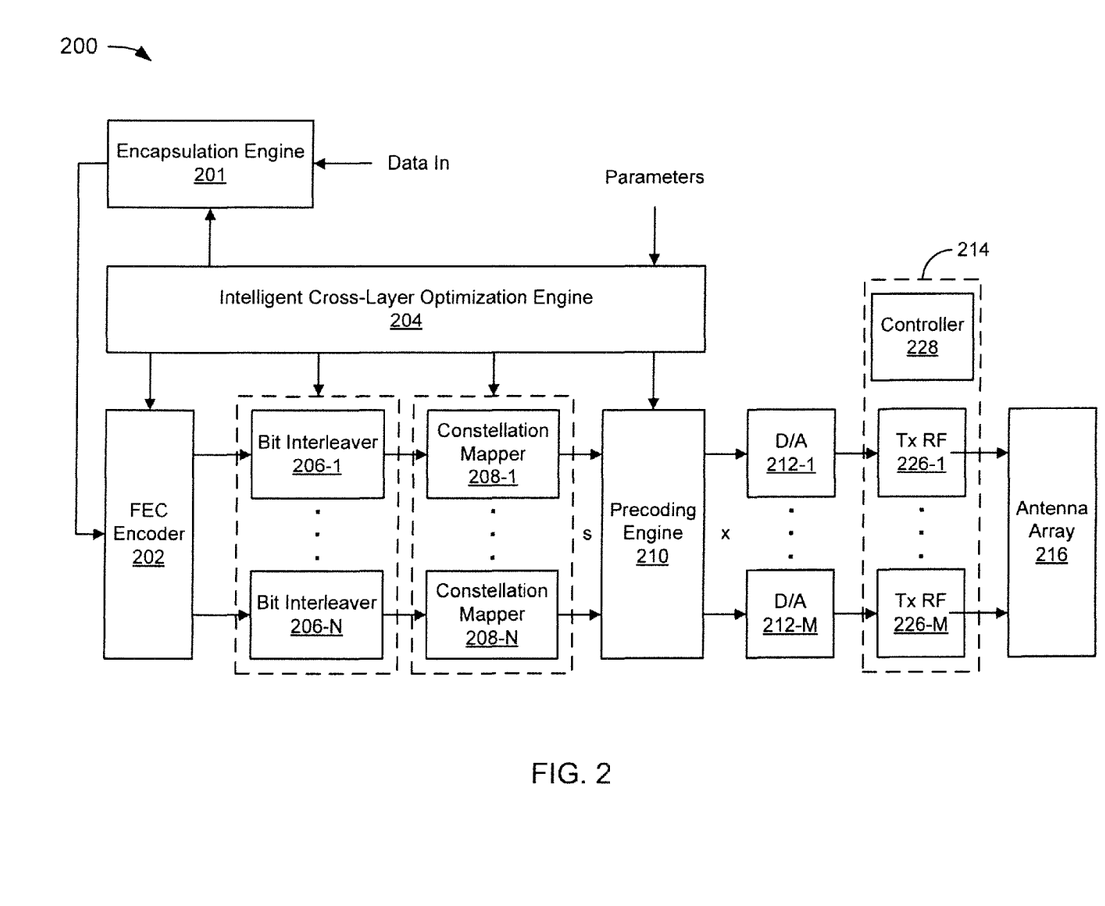
FIG. 2 depicts an example of a device suitable for use as a transmitter utilizing intelligent cross-layer optimization in a beamforming-capable system.

FIG. 2 depicts an example of a device 200 suitable for use as a transmitter utilizing intelligent cross-layer optimization in a beamforming-capable system. The device 200 includes an encapsulation engine 201, a forward error correction (FEC) encoder 202, an intelligent cross-layer optimization engine 204, bit interleavers 206-1 to 206-N (referred to collectively as bit interleavers 206), constellation mappers 208-1 to 208-N (referred to collectively as constellation mappers 208), a precoding engine 210, DACs 212-1 to 212-M (referred to collectively as DAC 212), an RF module 214, and antenna array 216.

In the example of FIG. 2, data is provided to the encapsulation engine 201. The encapsulation engine is part of a DLL. So packet-level aggregation and fragmentation can be implemented at the encapsulation level in accordance with rules derived from patent-specific and environment-specific characteristics.

Data bits from the encapsulation engine 201 are encoded at the FEC encoder 202. An FEC encoder is provided in this example because it is a typical device to encode bits in applications such as this. This component, and other components of the example of FIG. 2, could be replaced with alternative components that are capable of providing a signal associated with data, bits to the antenna array 216 for transmission onto a MIMO channel with appropriate MCS.

In the example of FIG. 2, the intelligent cross-layer optimization engine receives parameters that facilitate appropriate rate selection and treatment of data. The intelligent cross-layer optimization engine 204 controls the FEC encoder 202 such that coding of the data bits is in accordance with the parameters. Depending upon the implementation, the intelligent cross-layer optimization engine 204 can also control the bit interleavers 206. This may include incorporating knowledge about the MCS that is appropriate for the data. Depending upon the implementation, the intelligent cross-layer optimization engine 204 can also control the constellation mappers 208. Depending upon the implementation, the intelligent cross-layer optimization engine 204 can also control the precoding engine 210, and could even provide the precoding matrix Q.

In the example of FIG. 2, the coded bits are demultiplexed into $N_s$ independent spatial streams, which are provided to the bit interleavers 206. The number of bit interleavers will typically correspond to the number of spatial streams, though it is conceivable that a system could have more (perhaps unused) or fewer (though this would be of dubious value using state of the art techniques) bit interleavers.

In the example of FIG. 2, the interleaved bits are mapped to constellation symbols (such as quadrature amplitude modulation) at the constellation mappers 208. A large number of bits in a constellation corresponds to a "high" modulation (or a high MCS). The number of constellation mappers will typically correspond to the number of spatial streams, though it is conceivable that a system could have more (perhaps unused) or fewer constellation mappers. One can use fewer constellation mappers than spatial streams by multiplexing/switching so that one constellation mapper could service multiple streams. This saves space, cost, etc., as would be expected for reusing any piece of hardware. The constellation symbols are collected to form the $N_s \times 1$ constellation vector s.

In the example of FIG. 2, the constellation vector s is combined with a precoding matrix Q at the precoding engine 210. In this example, the precoding engine generates an $M_t \times 1$ transmitted vector x, where x=Qs. Alternatively, the constellation vector s and the precoding matrix Q could be combined in some other manner.

In the example of FIG. 2, the digital vector x is converted to analog waveforms at the DAC 212. The number of DACs will typically correspond to the number of antennas in the antenna array 216, though it is conceivable that the DAC 212 could include more or fewer DACs.

In the example of FIG. 2, the analog waveforms are upconverted to the desired carrier frequency at the RF module 214. The RF module 214 includes RF chains 226-1 to 226-M (referred to collectively as RF chains 226) and a controller 228. The analog waveforms are provided through the RF chains 226 (the number of RF chains 226 will typically correspond to the number of antennas in the antenna array 216) to the antenna array 216 for transmission. The RF chains 226 are part of a circuit that includes the controller 228, which is typically capable of tuning to a desired carrier frequency.

Figure 3:
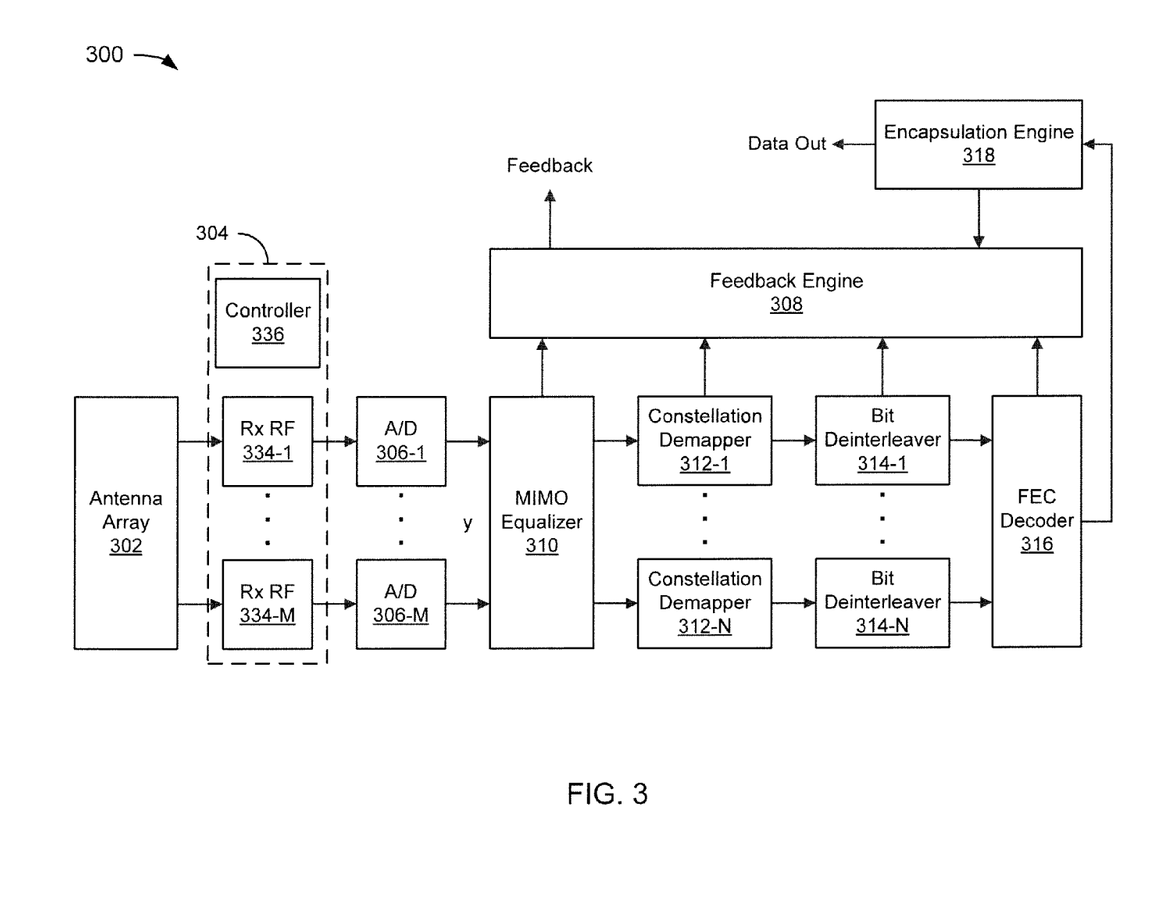
FIG. 3 depicts an example of, a device suitable for use as a receiver utilizing an intelligent cross-layer optimization engine in a beamforming-capable system.

FIG. 3 depicts an example of a device 300 suitable for use as a receiver utilizing an intelligent cross-layer optimization engine in a beamforming-capable system. The device 300 includes an antenna array 302, an RF module 304, analog-to-digital converters (ADCs) 306-1 to 306-M (referred to collectively as the ADC 306), a feedback engine 308, a MIMO equalizer 310, constellation demappers 312-1 to 312-N (referred to collectively as the constellation demappers 312), bit deinterleavers 314-1 to 314-N (referred to collectively as the bit deinterleavers 314), an FEC decoder 316, and an encapsulation engine 318.

It may be noted that the device 300 includes components that may or may not be implemented, but which are provided as an example. For example, the signal processing (from the MIMO equalizer 310 to the FEC decoder 316) could be simplified and/or replaced if the device 300 were acting as receive chains collocated with transmit chains.

In the example of FIG. 3, signals are collected by the antenna array 302, and downconverted to baseband at the RF module 304. The RF module 304 includes RF chains 334-1 to 334-M (referred to collectively as the RF chains 334) and a controller 336. The RF chains 334 are part of a circuit that includes the controller 336, which is capable of tuning to a desired carrier frequency. In the example of FIG. 3, the analog baseband waveforms are digitized at the ADC 306 to produce an $M_r \times 1$ digital received vector y.

In the example of FIG. 3, the feedback engine 308 provides feedback to a transmitter (not shown) that includes either unprocessed data from various components in the device 300, or the feedback engine 308 could process the data and send the processed data as feedback. The feedback can include any known or convenient data that would be useful in at least determining channel conditions and, more generally, environmental characteristics.

In the example of FIG. 3, the MIMO equalizer 310 receives digitized signal from the ADC 306 and applies the matrix Q to form an $N_s \times 1$ equalized vector. In the example of FIG. 3, the equalized vector passes through the constellation demappers 312 and at the bit-deinterleavers 314, the $N_s$ data streams are multiplexed into a single stream, data bits are obtained by the FEC decoder 316, and the data bits are provided to the encapsulation engine 318 for encapsulation into packets.

It may be noted that a station that is capable of transmitting and receiving (i.e., a transceiver) could include both a transmit chain (see FIG. 2) and a receive chain (as in FIG. 3). In any case, it should be noted that receive chains can be different (e.g., include different components, include more or less of a particular component, etc.) if an external device is sending a signal that is different than that associated with the device 300's standard receive chain (or one of its standard receive chains). So the device 300 may include different or different numbers of components in various receive chains, some of which are "incomplete" in the sense that the receive chain cannot process a signal from receipt on one or more antennas to deciphering the payload.

Figure 4:
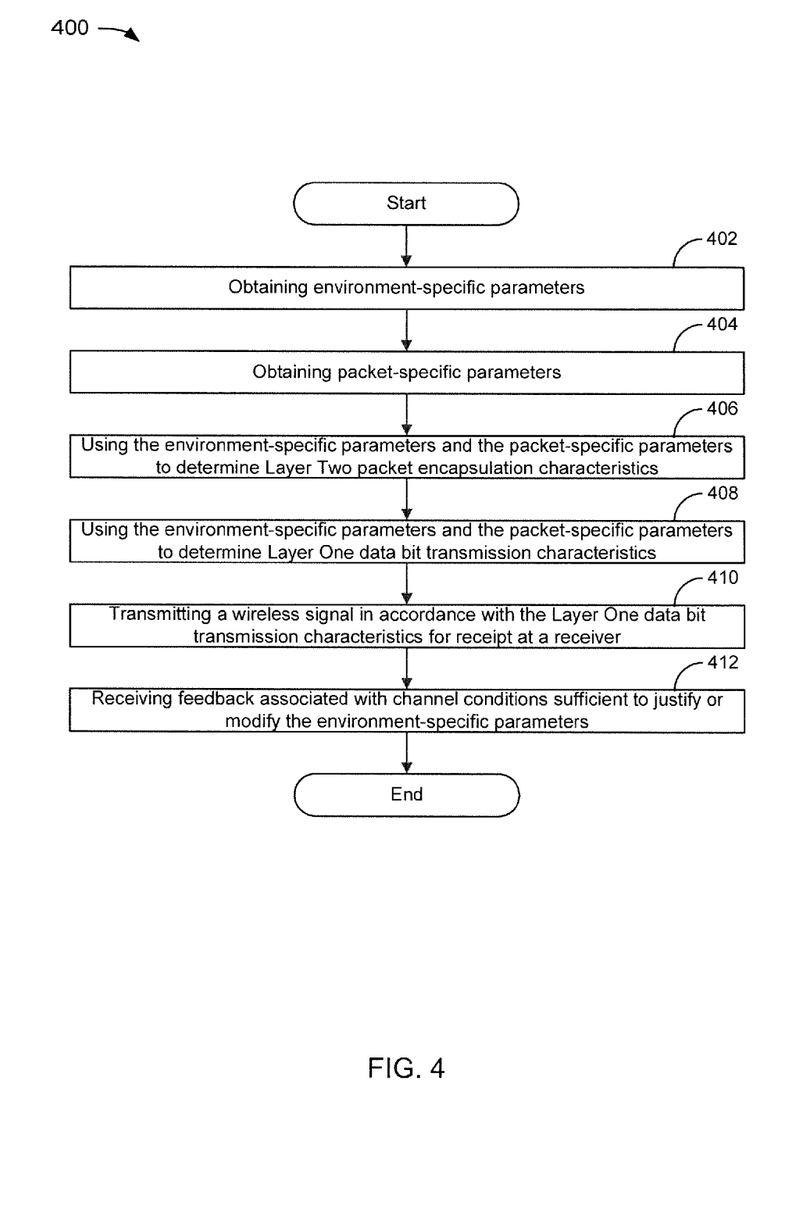
FIG. 4 depicts a flowchart of an example of a method for performing intelligent cross-layer optimization.

FIG. 4 depicts a flowchart 400 of an example of a method for performing intelligent cross-layer optimization. Although this figure depicts functional modules in a particular order for purposes of illustration, the process is not limited to any particular order or arrangement. One skilled in the relevant art will appreciate that the various modules portrayed in this figure could be omitted, rearranged, combined and/or adapted in various ways.

In the example of FIG. 4, the flowchart 400 starts at module 402 with obtaining environment-specific parameters. Environment-specific parameters are useful for setting characteristics of data at the PHY because knowledge of, e.g., channel characteristics enables a transmitter to intelligently choose MCS and other values that are optimal for the given channel. For example, if a channel is experiencing periodic or otherwise predictable interference, the transmitter can adjust the start of transmission time for packets (potentially, though not necessarily, as a function of user or service constraints as well as channel conditions). Knowledge of the medium can also enable better use of PHY reservation protocols, such as RTS/CTS (potentially, though not necessarily, as a function of user or service preferences as well as channel conditions). Knowledge of the channel can also lead to more appropriate MCS choices, such as by choosing a lower MCS for bad channels, or decisions to send data redundantly (potentially, though not necessarily, as a function of user or service priorities as well as channel conditions).

In the example of FIG. 4, the flowchart 400 continues to module 404 with obtaining packet-specific parameters. Packet-specific parameters can include length, priority, delay constraints, frame type, or the like.

In the example of FIG. 4, the flowchart 400 continues to module 406 with using the environment-specific parameters and the packet-specific parameters to determine Layer Two packet encapsulation characteristics. The Layer Two, or DLL, packet encapsulation characteristics can include size. So the parameters could result in a packet being fragmented or in multiple packets being aggregated.

In the example of FIG. 4, the flowchart 400 continues to module 408 with using the environment-specific parameters and the packet-specific parameters to determine Layer One data bit transmission characteristics. The Layer One, or PHY, data bit transmission characteristics can include MCS, start of transmission, redundancy, a decision to reserve media, or the like. Each of the characteristics could be collectively adjusted for each user in a multi-user MIMO group (transmission start times would be the same, but start time for each user of the multi-user MIMO group could be adjusted).

In the example of FIG. 4, the flowchart 400 continues to module 410 with transmitting a wireless signal in accordance with the Layer One data bit transmission characteristics for receipt at a receiver.

In the example of FIG. 4, the flowchart 400 continues to module 412 with receiving feedback associated with channel conditions sufficient to justify or modify the environment-specific parameters. It may be noted that module 412 is optional because a transmitter does not have to receive feedback from a receiver in order to estimate channel characteristics.

In the example of FIG. 4, the flowchart 400 continues to module 412 with obtaining packet priority information associated with the PER constraint parameter from a packet of the data. QoS can be ensured using resource reservation or differentiated services. In the context of this paper, the parameters are more akin to the differentiated services, but could be "on top of" a reservation protocol that takes care of QoS. With differentiated services, packets are marked according to the type of service they need. The markings use, for example, 6 bits in the IP packet header, but at the MAC sublayer of the Physical Layer, IEEE 802.1Q and IEEE 802.1p can be used to carry essentially the same information. The packet priority information associated with the PER constraint can be provided using these or other applicable known or convenient mechanisms, with appropriate changes to include the packet priority information.

Systems described herein may be implemented on any of many possible hardware, firmware, and software systems. Algorithms described herein are implemented in hardware, firmware, and/or software that is implemented in hardware. The specific implementation is not critical to an understanding of the techniques described herein and the claimed subject matter.

In this paper, an engine includes a dedicated or shared processor and, hardware, firmware, or software modules embodied in a computer-readable medium, that are executed by the processor. Depending upon implementation-specific or other considerations, an engine can be centralized or its functionality distributed. An engine can include special purpose hardware, firmware, or software embodied in a computer-readable medium for execution by the processor. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

As used in this paper, the term "packet" is not intended to refer to data at any particular layer of the OSI model, or some other model. Rather, the term is intended to be construed broadly to include any packetized data, though the term could be limited in scope (e.g., to a frame, datagram, or other encapsulated data unit) depending upon the context.

As used in this paper, the term "embodiment" means an embodiment that serves to illustrate by way of example but not necessarily by limitation.

The invention claimed is:

1. A system comprising:
   an intelligent cross-layer optimization engine configured to receive packet-specific parameters and environment-specific parameters;
   a physical coding sublayer (PCS) engine coupled to the intelligent cross-layer optimization engine, wherein the PCS engine includes:
      a source encoder that is configured to divide the data into multiple parallel bit streams of decreasing priority in accordance with the parameters;
      a channel encoder that includes multiple codes with decreasing codeword distances;
   a point selector that is configured to choose constellation point corresponding to $$s = \sum_{i=1}^{M} s_i 2^{i-1},$$

where s is the constellation point, M is the number of parallel bit streams and the number of codes;
   a physical medium-dependent sublayer (PMD) engine coupled to the PCS engine;
   an antenna coupled to the PMD engine;
wherein, in operation:
   the intelligent cross-layer optimization engine uses the environment-specific parameters and the packet-specific parameters to determine Layer One data bit transmission characteristics in a packet-specific manner;
the PCS engine applies the data bit transmission characteristics to data;
the PMD engine generates a wireless signal including the data for transmission via the antenna.

* * * * *